(12) United States Patent
Gaw, Jr. et al.

(10) Patent No.: US 10,173,599 B2
(45) Date of Patent: Jan. 8, 2019

(54) ADJUSTABLE DEVICE PLACEMENT SYSTEM OF CONSOLE BIN

(71) Applicant: GM Global Technology Operations LLC, Detroit, MI (US)

(72) Inventors: William D. Gaw, Jr., Rochester Hills, MI (US); Dennis L. Arnold, Davison, MI (US); Jeffrey M. Hauser, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 15/409,924

(22) Filed: Jan. 19, 2017

(65) Prior Publication Data

US 2018/0201197 A1    Jul. 19, 2018

(51) Int. Cl.
| | |
|---|---|
| *B60R 13/00* | (2006.01) |
| *B60R 7/04* | (2006.01) |
| *B60R 7/08* | (2006.01) |
| *B60R 11/02* | (2006.01) |
| *B60R 16/03* | (2006.01) |
| *B60R 11/00* | (2006.01) |

(52) U.S. Cl.
CPC .............. *B60R 7/04* (2013.01); *B60R 7/087* (2013.01); *B60R 11/0241* (2013.01); *B60R 16/03* (2013.01); *B60R 2011/0007* (2013.01); *B60R 2011/0084* (2013.01); *B60Y 2410/115* (2013.01)

(58) Field of Classification Search
CPC ..... B60Y 2410/115; B60R 7/04; B60R 7/087; B60R 11/0241; B60R 16/03; B60R 2011/0007; B60R 2011/0084
See application file for complete search history.

(56) References Cited

U.S. PATENT DOCUMENTS

| | | |
|---|---|---|
| 5,551,680 A | 9/1996 | Ohmichi et al. |
| 6,206,260 B1 | 3/2001 | Covell et al. |
| 7,150,204 B2 | 12/2006 | Uphaus et al. |
| 7,377,223 B2 | 5/2008 | Toupin et al. |
| 7,393,037 B2 | 7/2008 | Hwang |
| 7,543,874 B2 * | 6/2009 | Ogura .................. B60R 7/04 296/24.34 |

(Continued)

OTHER PUBLICATIONS

U.S. Appl. No. 15/085,347, filed Mar. 30, 2016, Kiester et al.
U.S. Appl. No. 15/130,394, filed Apr. 15, 2016, Kiester et al.

*Primary Examiner* — Lori L Lyjak (57) ABSTRACT

An adjustable device placement system of a vehicle includes a center console bin of an armrest. A separator wall within the center console bin divides the center console bin into a first section and a second section. An aperture has notches spaced vertically along the aperture. A position mechanism is disposed within the aperture. The position mechanism includes c-channels formed along lateral sides of the position mechanism and receives sides of the separator wall that define the aperture. The position mechanism remains in direct contact with the separator wall as the position mechanism slides vertically within the aperture. The position mechanism includes tabs that extend perpendicularly away from the separator wall and teeth that enter the notches, thereby locking the position mechanism into a position. A bottom portion extends a predetermined distance away from the separator wall and toward a front wall of the center console bin.

20 Claims, 5 Drawing Sheets

(56) References Cited

U.S. PATENT DOCUMENTS

| | | |
|---|---|---|
| 9,225,377 B1 | 12/2015 | Hart |
| 9,714,530 B2 | 7/2017 | Amick et al. |
| 9,738,227 B2 * | 8/2017 | Huebner .................. B60R 7/08 |
| 9,744,858 B2 | 8/2017 | Hall et al. |
| 2009/0075704 A1 | 3/2009 | Wang |
| 2009/0146444 A1 * | 6/2009 | Ichimaru ................ B60N 3/102 296/37.8 |
| 2011/0084511 A1 | 4/2011 | Evans et al. |
| 2013/0049682 A1 | 2/2013 | Niec et al. |
| 2013/0134930 A1 | 5/2013 | Konkle et al. |
| 2014/0265555 A1 | 9/2014 | Hall et al. |
| 2016/0004281 A1 | 1/2016 | Fischer |
| 2016/0072327 A1 | 3/2016 | Knutson et al. |
| 2016/0105048 A1 | 4/2016 | Lee et al. |
| 2018/0126919 A1 * | 5/2018 | Huebner ................ B60R 11/02 |

* cited by examiner

ADJUSTABLE DEVICE PLACEMENT SYSTEM OF CONSOLE BIN

FIELD

The present disclosure relates to vehicle console bins and more particularly to adjustable device placement systems of vehicle console bins.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle may have one or more console bins, each of the console bins including one or more different sections and/or compartments. One or more of the compartments may be designed to store a mobile electronic device, such as a phone, tablet, iPod or other music playing device, etc. One example console bin is a center console bin located between a driver's seat and a front passenger's seat. The center console bin may be located beneath an armrest.

Some vehicles include one or more other compartments for storing items and/or mobile electronic devices, such as a glove box or a center stack console. The glove box and the center stack console may include one or more different sections for storing items.

SUMMARY

An adjustable device placement system of a vehicle includes a center console bin of an armrest. The center console bin includes a front wall, a back wall, a first side wall, and a second side wall. A separator wall within the center console bin includes a first face and a second face opposite the first face that divides the center console bin into a first section and a second section. The first section is defined by a first portion of the first side wall, a first portion of the second side wall, the front wall, and the first face of the separator wall. The second section is defined by a second portion of the first side wall, a second portion of the second side wall, the back wall, and the second face of the separator wall. An aperture defines a vertical opening within the separator wall. The aperture has notches spaced vertically along the aperture. A position mechanism is disposed within the aperture. The position mechanism includes c-channels that are formed along lateral sides of the position mechanism and that receive sides of the separator wall that define the aperture such that the position mechanism remains in direct contact with the separator wall as the position mechanism slides vertically within the aperture. The position mechanism includes tabs that extend perpendicularly away from the separator wall. The position mechanism includes teeth that enter the notches, thereby locking the position mechanism into a position. The position mechanism has a bottom portion that extends a predetermined distance greater than zero away from the first face of the separator wall and toward the front wall of the center console bin.

In other features, the bottom of the position mechanism includes an opening. In other features, the opening is trapezoidal. In other features, the opening is has a width that is greater than a predetermined diameter of a coin. In other features, the opening has a width that is greater than a predetermined maximum width of connectors of cables that connect mobile electronic devices to the vehicle via a Universal Serial Bus (USB) port of the vehicle. In other features, the teeth are located within the c-channels of the position mechanism. In other features, the position mechanism slides vertically within the aperture when the teeth are disengaged from the notches in the aperture. In other features, the bottom portion extends the predetermined distance away from the first face of the separator wall and toward the front wall of the center console bin at an angle that is perpendicular to the first face of the separator wall.

In other features, the bottom portion extends the predetermined distance away from the first face of the separator wall and toward the front wall of the center console bin forming an acute angle between the bottom portion and the first face of the separator wall. In other features, the bottom portion extends the predetermined distance away from the first face of the separator wall and toward the front wall of the center console bin forming an obtuse angle between the bottom portion and the first face of the separator wall. In other features, the position mechanism consists of a thermoplastic elastomer. The vehicle includes the adjustable device placement system, and a wireless charging device positioned at the front wall of the center console bin. In other features, the wireless charging device generates an electrical field within a predetermined area adjacent to the front wall of the center console bin within the center console bin.

In other features, the adjustable device placement system includes an armrest that covers the center console bin and that is hinged at one of: the back wall, the first side wall, and the second side wall. In other features, the armrest completely covers the second section and does not cover the first section. In other features, the bottom portion extends away from the first face of the separator wall and toward the front wall of the center console bin to within less than one millimeter from the front wall of the center console bin. In other features, the bottom portion of the position mechanism includes an opening at a side of the bottom portion that is closest to the front wall of the center console bin.

A vehicle includes a center console bin that includes a front wall, a back wall, a first side wall, and a second side wall. A separator wall within the center console bin that includes a first face and a second face opposite the first face and that divides the center console bin into a first section and a second section. The first section defined by a first portion of the first side wall, a first portion of the second side wall, the front wall, and the first face of the separator wall. The second section is defined by a second portion of the first side wall, a second portion of the second side wall, the back wall, and the second face of the separator wall. A wireless charging device is positioned at the front wall of the center console bin and generates an electrical field within a predetermined area adjacent to the front wall of the center console bin within the center console bin. An aperture defines a vertical opening within the separator wall. The aperture has notches spaced evenly vertically along the aperture. A position mechanism is disposed within the aperture. The position mechanism includes c-channels that are formed along lateral sides of the position mechanism and that receive sides of the separator wall that define the aperture such that the position mechanism. The position mechanism slides vertically within the aperture. The position mechanism includes tabs that extend perpendicularly away from the separator wall. The position mechanism includes teeth that enter the notches, thereby locking the position mechanism into a position. A bottom portion extends away from the first face of the separator wall and toward the front wall of the center console bin to within a predetermined distance of the front wall of the center console bin. An opening formed at a side of the bottom portion that is closest to the front wall of the center console bin.

In other features, the bottom portion that extends away from the first face of the separator wall and toward the front wall of the center console bin to within one millimeter of the front wall of the center console bin. In other features, the opening is trapezoidal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A section of a center console bin of a vehicle may be designed to store a mobile electronic device, such as a smartphone. For example, the center console bin may be located beneath and closed (from the top) by an armrest. To accommodate mobile electronic devices of different sizes, the center console bin may include an adjustable device placement system. The adjustable device placement system may include a position mechanism that can be actuated to lift or lower a bottom against which devices rests due to gravity. This allows a user to position (lift and lower) a mobile electronic device such that the mobile electronic device can be easily accessed and possibly viewed while located within the center console bin.

The position mechanism may also include an opening to allow the user to charge the device by wire while storing the device. Further, the ability of the adjustable device placement system to lift and lower a mobile electronic device may enable the adjustable device placement system to position different types of mobile electronic devices and/or mobile electronic devices of different sizes within a wireless charging area and be charged wirelessly in vehicles equipped with a wireless charger.

Figure 1:
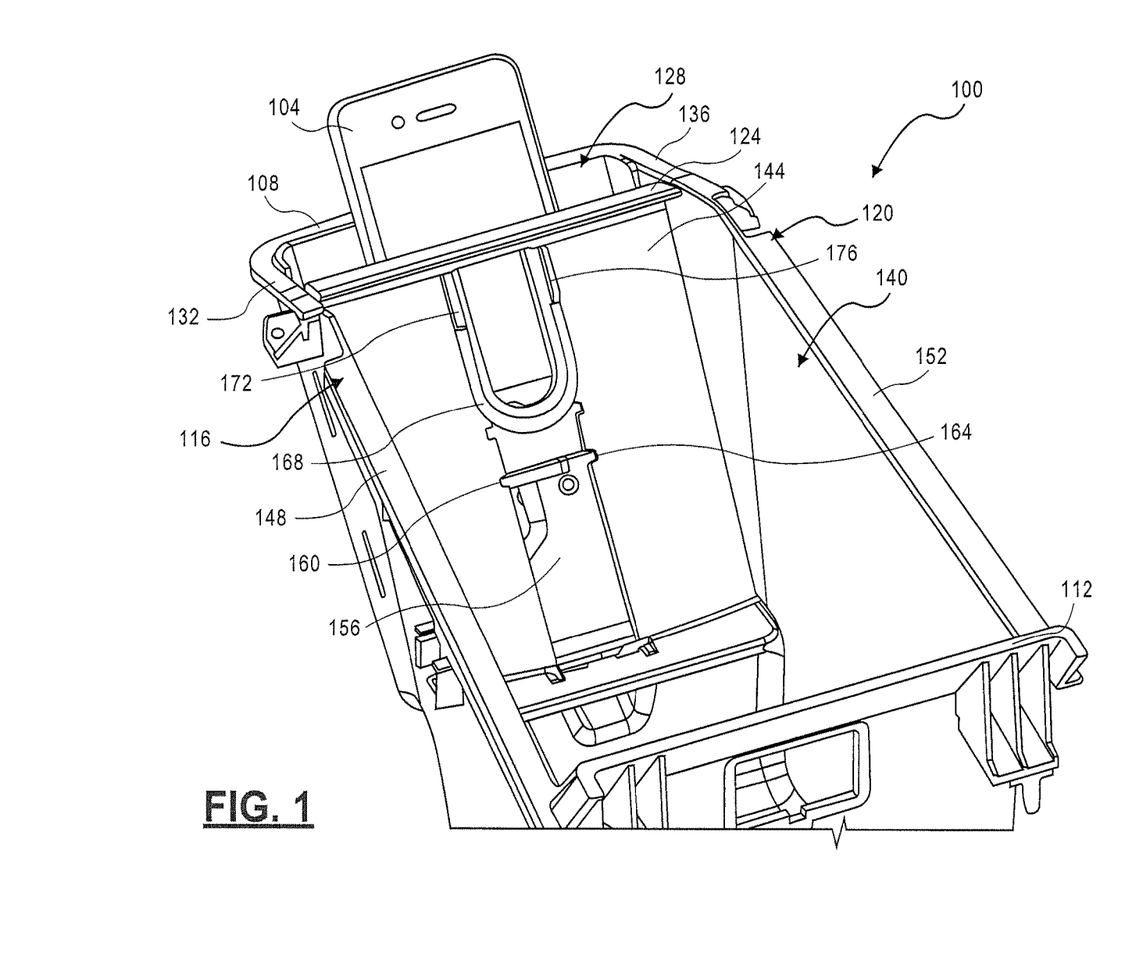
FIG. 1 is a view of an example adjustable device placement system in a console bin.

Referring to FIG. 1, a view of an example adjustable device placement system in a console bin 100 is shown. The console bin 100 includes the adjustable device placement system for a mobile electronic device 104 ("device 104") to rest. The device 104 may be, for example, a mobile phone, a tablet, or another type of mobile electronic device having a re-chargeable battery. The adjustable device placement system is configured to accommodate mobile electronic devices of a plurality of different sizes, manufacturers, and types.

The console bin 100 includes four walls: a first wall 108, a second wall 112, a first side wall 116, and a second side wall 120. The console bin 100 also includes a separator wall 124 that divides the console bin 100 into two sections: a first section 128 and a second section 140. The first section 128 of the console bin 100 is defined by the first wall 108, a first face 208 (shown in FIG. 2B) of the separator wall 124, a portion of the first side wall 132 located between the first wall 108 and the first face 208, and a portion of the second side wall 136 located between the first wall 108 and the first face 208. The second section 140 of the console bin 100 is defined by a second face 144 of the separator wall 124, the second wall 112, a remainder portion of the first side wall 148 located between the second wall 112 and the second face 144, and a remainder portion of the second side wall 152 located between 112 and the second face 144.

The separator wall 124 includes an aperture 156. The aperture 156 includes a plurality of notches, such as notches 160 and 164. A position mechanism 168 is disposed within and slides along the aperture 156 of the separator wall 124. The position mechanism 168 may be adjusted to a plurality of different (discrete) locations along the aperture 156 via the notches.

Pairs of the notches, such as the notches 160 and 164, are positioned across the aperture 156 from each other. Each of the notches is configured to engage with (e.g., receive) one or more teeth (e.g., shown in FIG. 2A) on the position mechanism 168. The notches (e.g., pairs) are spaced (e.g., evenly) along the aperture 156 to receive the one or more teeth of the position mechanism 168 and position the position mechanism 168 at different locations. There are multiple pairs of notches to accommodate user preference with respect to device positioning as well as different device sizes, types, and manufactures. The present application illustrates pairs of notches on both sides of the aperture 156. In alternative embodiments, notches may be only along one side of the aperture 156. Space between notch pairs or adjacent notches may be even, uneven, larger, and/or smaller than shown. Also, while the notches are illustrated as being rectangular or square in shape, the notches may be another suitable shape, such as triangular or circular as examples.

Figure 2A:
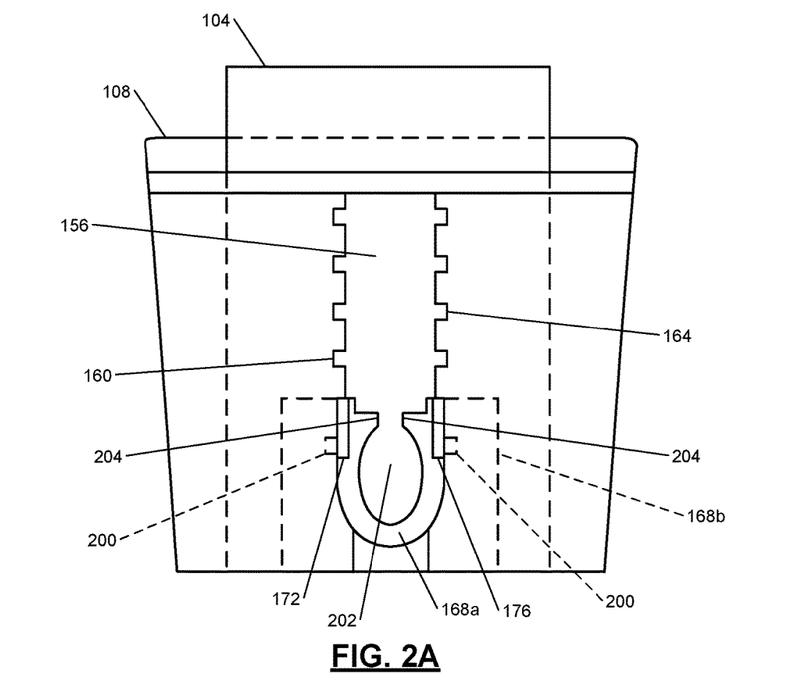
FIG. 2A is an example front view of the adjustable device placement system in the console bin.

Referring now to FIG. 2A, an example front view of the adjustable device placement system in the console bin 100 is shown. More specifically, FIG. 2A is a view from the second wall 112 of the console bin 100 looking toward the separator wall 124.

The position mechanism 168 includes a u-shaped member 168a that includes tabs 172 and 176 located on each side (prong) of the u-shape. A user may apply a force from outside of the U-shape to within the U-shape and squeeze the tabs 172 and 176 inward, toward the center of the aperture 156 and away from the notches 160 and 164 to disengage the position mechanism 168. This allows the position mechanism 168 to slide vertically within the aperture 156.

The position mechanism 168 includes the u-shaped member 168a and a back portion 168b that is located behind the separator wall 124. The u-shaped member 168a and the back portion 168b are connected through the aperture 156. The u-shaped member 168a and the back portion 168b may be one piece (i.e., be formed via a one-piece construction). The u-shaped member 168a, the back portion 168b, and the connection between the two may form c-channels 170. The sides of the separator wall 124 defining the aperture 156 extends to within the c-shapes of the c-channels 170 to maintain the position mechanism 168 within the aperture 156.

The back portion 168b includes a bottom portion 168c (e.g., shown in FIG. 2B) that extends away from the separator wall 124, thereby making an L-shape. The L-shape does not need to create a right angle. In other words, the bottom portion 168c need not extend perpendicular to the back portion 168b and/or the separator wall 124. Instead, the back portion 168b and the bottom portion 168c may create an acute or obtuse angle where connected.

When stored, the device 104 rests against the front wall 108 and the bottom portion 168c due to gravity. The tabs 172 and 176 of the u-shaped member 168a may be squeezed inward toward the center of the aperture 156 and away from the notches to re-position the position mechanism 168.

When the tabs 172 and 176 of the u-shaped member 168a are squeezed, the one or more teeth, such as teeth 200, disengage the notches of the aperture 156. The teeth 200 may be located within the c-channels 170. When the u-shaped member 168a is disengaged, a user may slide the position mechanism 168 along the aperture 156, upward and downward, lifting and lowering the device 104 via the bottom portion 168c. The u-shaped member 168a is resilient such that, when the u-shaped member 168a is released, the teeth 200 are biased against the walls of the aperture 156 and, if adjacent, into ones of the notches at the locations of the teeth 200. Similar to the number and placement of the notches 160 and 164, the position mechanism 168 may have only one tooth on only one side of the u-shaped member 168a, two teeth including one tooth on each side (of the u-shape) of the u-shaped member 168a, or more than two teeth.

The u-shaped member 168a may include a generally oval shaped aperture 202. The u-shaped member 168a may include one flange 204 on each side of the top of the u-shaped member 168a. The flanges 204 may be disposed vertically adjacent to the tabs 172 and 176 on the u-shaped member 168a. The flanges 204 limit the amount the u-shaped member 168a may be squeezed away from the notches.

Figure 2B:
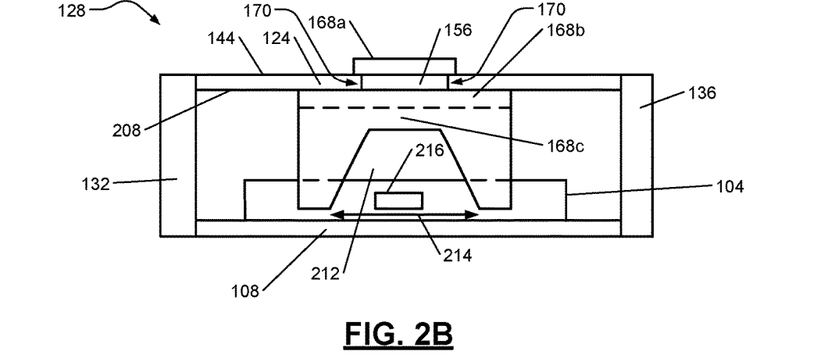
FIG. 2B is a bottom view of the adjustable device placement system in the console bin.

Referring now to FIG. 2B, a bottom view of the adjustable placement system in the console bin 100 is shown. More specifically, FIG. 2B is a bottom view of the first section 128 of the console bin 100 viewed from a floor 516 (e.g., shown in FIGS. 5A and 5B) of the console bin 100.

The u-shaped member 168a contacts the second face 144 of the separator wall 124, and the back portion 168b is in contact with the first face 208 of the separator wall 124. As shown, the u-shaped member 168a, the back portion 168b, and the portion of the position mechanism 168 form the c-channels 170 that contact the inner surfaces of the aperture 156.

Figure 4:
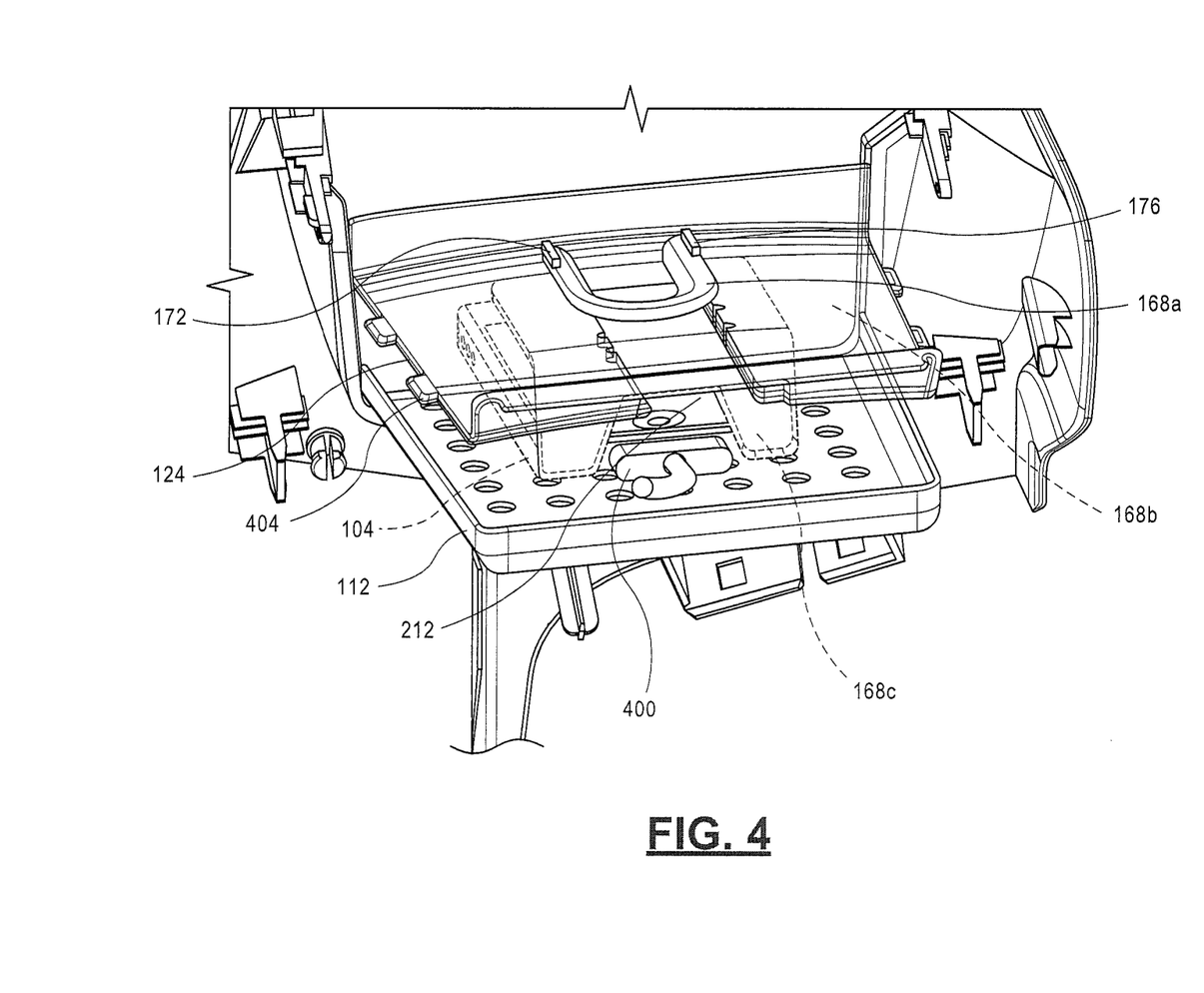
FIG. 4 is an example bottom view of the adjustable device placement system in the console bin.

In some embodiments, the bottom portion 168c may include an opening 212. The opening 212, for example, may be trapezoidal. Alternatively, the opening 212 could be a square, rectangle, circle, or another suitable shape. The opening 212 allows for access to a charging port 216 of the device 104. For example, as generally shown in FIG. 4, a charging cord 400 may pass through the opening 212 and connect to the charging port 216 of the device 104.

The opening 212 also allows loose items to pass through the opening 212 onto the floor 516 of the console bin 100. For example, when the user places the device 104 in the adjustable device placement system, the user could be removing the device 104 from a pocket. When removing the device 104 from a pocket, the user may also remove change and/or other items along with the device 104. Items other than the device 104 that may pass through the opening 212. Metallic objects may interfere with wireless charging. The opening 212 has a width 214 nearest to the front wall 108. The width 214 may be greater than a predetermined distance. For example, the width 214 may be greater than a predetermined diameter of a coin, such as a U.S. quarter, a U.S. Dollar, or a U.S. Fifty-cent piece. Additionally or alternatively, the width 214 may be greater than a predetermined maximum width of available connectors of cables that connect mobile electronic devices to the vehicle via a Universal Serial Bus (USB) port of the vehicle.

The bottom portion 168c may extend to contact the front wall 108, to the portion of the first side wall 132, and/or to the portion of the second side wall 136. In the example embodiment of FIG. 2B, the bottom portion 168c does not contact the portion of the first side wall 132 or the second side wall 136. The spaces between the end of the bottom portion 168c and the first and second side walls 132 and 136 allow items to pass through to the floor 516 of the console bin 100.

Figure 3:
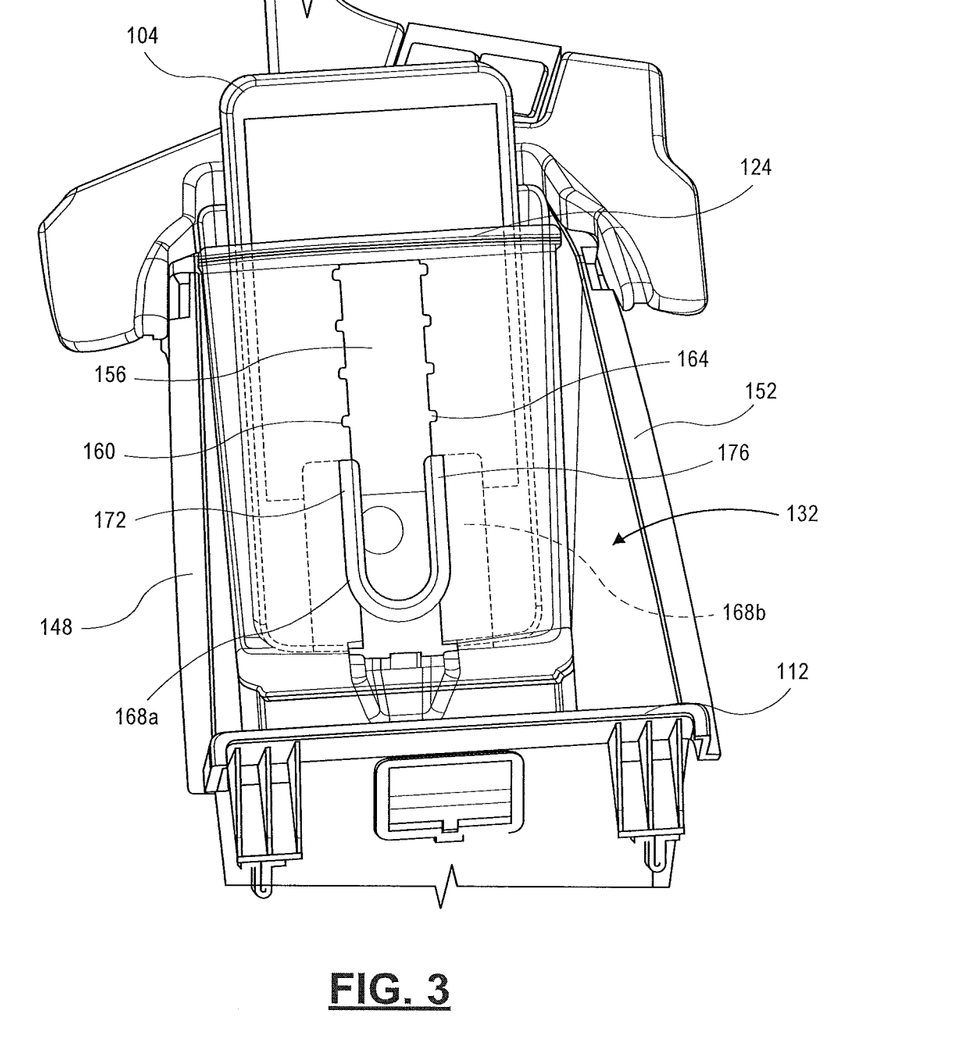
FIG. 3 is an example front view of the adjustable device placement system in the console bin.

Referring to FIG. 3, an example front view of the adjustable device placement system in the console bin 100 is shown. In FIG. 3, the back portion 168b is shown behind the separator wall 124 and against the first face 208 of the separator wall 124. The u-shaped member 168a is shown without the flanges 204. For example only, the position mechanism 168 (e.g., including 168a, 168b, and 168c) may be one piece and made out of a thermoplastic elastomer, such as TPO. Using such a material allows the position mechanism 168 to be squeezed for positioning yet return toward the walls of the aperture 156 when the squeezing force is released.

Referring to FIG. 4, an example bottom view of the adjustable device placement system in the console bin 100 is shown. The charging cord 400 is shown passing through the opening 212. Additionally, the separator wall 124 includes pieces (e.g., tabs) 404 protruding from the separator wall 124 that connect the separator wall 124 to (e.g., enter apertures in) the first side wall 116 and the second side wall 120.

Figure 5A:
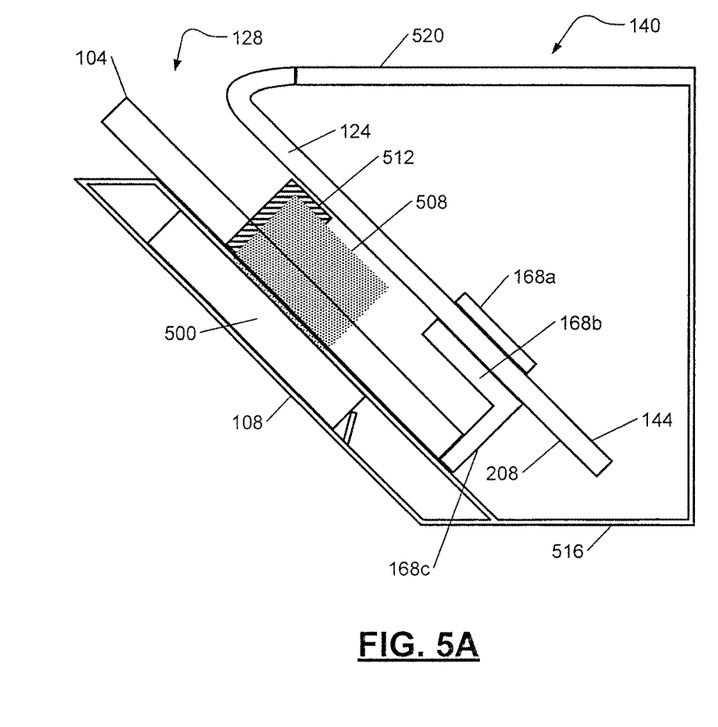
FIGS. 5A and 5B are example side views of the adjustable device placement system in the console bin with a wireless charging device.

Referring to FIG. 5A, an example side view of the adjustable device placement system in the console bin 100 with a wireless charging device is shown. FIG. 5A illustrates the adjustable device placement system with a wireless charging device 500 included at the front wall 108. For example only, the wireless charging device 500 may be manufactured according to protocols developed by Wireless Power Consortium (WPC), the Power Matters Alliance (PMA), or the Alliance for Wireless Power (A4WP). The wireless charging device 500 may be spaced a predetermined distance from the device 104 or have a predetermined clearance, for example, for purposes of heat dissipation.

The wireless charging device 500 provides wireless charging (i.e., electric field) within a predetermined charging zone 508. For example only, a transmitter charging zone 508 of the wireless charging device 500 may be 20 millimeters by 60 millimeters. The device 104 may have a receiver charging zone 512. When the receiver charging zone 512 is within the transmitter charging zone 508, the device 104 receives power wirelessly and charges the re-chargeable battery of the device 104. Wireless charging may occur faster as more of the receiver charging zone 512 is within the transmitter charging zone 508 and vice versa. The position mechanism 168 may be lifted or lowered, for example, to position the receiver charging zone 512 within the transmitter charging zone 508.

The floor 516 of the console bin 100 is shown in FIG. 5A. A top 520 of the console bin 100 is also shown. For example, the top 520 of the console bin 100 may be an armrest. While the example of the top 520 not extending over the first section 128 is provided, the top 520 of the console bin 100 may extend partially or fully over the first section 128 and the second section 140. The top 520 may be hinged, for example, at the back wall 112, the side wall 148, or the side wall 152.

Figure 5B:
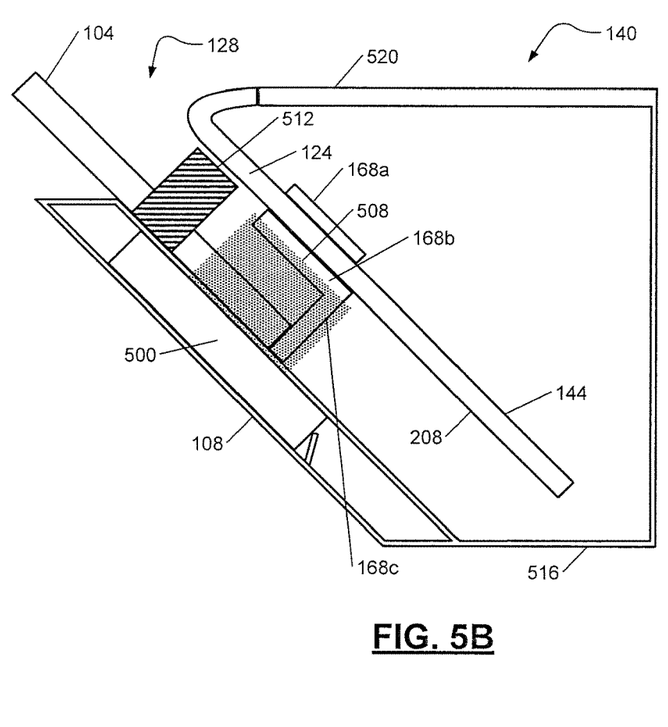

Referring to FIG. 5B, an example side view of the adjustable device placement system in the console bin 100 with the wireless charging device 500 is shown. FIG. 5B shows a (physically) smaller example of the device 104 and the position mechanism 168 is located higher along the aperture 156. Based on the wireless charging device 500 having the same position as in FIG. 5A and the device 104 of FIG. 5A being larger, to place the receiver charging zone 512 within the transmitter charging zone 508, the device 104 needs to positioned lower in FIG. 5B than the device 104 of FIG. 5A. As described above, the position mechanism 168 can be re-positioned to lower the device 104.

The device 104 is shown as partially protruding past a top rim of the first section 128 of the console bin 100. However, the device 104 may be fully within the first section 128 of the console bin 100.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An adjustable device placement system of a vehicle comprising:
   a center console bin of an armrest, wherein the center console bin includes a front wall, a back wall, a first side wall, and a second side wall;
   a separator wall within the center console bin that includes a first face and a second face opposite the first face and that divides the center console bin into:
      a first section defined by a first portion of the first side wall, a first portion of the second side wall, the front wall, and the first face of the separator wall; and
      a second section is defined by a second portion of the first side wall, a second portion of the second side wall, the back wall, and the second face of the separator wall;
   an aperture defining a vertical opening within the separator wall, the aperture having notches spaced vertically along the aperture;
   a position mechanism that:
      is disposed within the aperture;
      includes c-channels that are formed along lateral sides of the position mechanism and that receive sides of the separator wall that define the aperture such that the position mechanism remains in direct contact with the separator wall as the position mechanism slides vertically within the aperture;
      includes tabs that extend perpendicularly away from the separator wall;
      includes teeth that enter the notches, thereby locking the position mechanism into a position; and
      a bottom portion that extends a predetermined distance greater than zero away from the first face of the separator wall and toward the front wall of the center console bin.

2. The adjustable device placement system of claim 1 wherein the bottom portion of the position mechanism includes an opening.

3. The adjustable device placement system of claim 2 wherein the opening is trapezoidal.

4. The adjustable device placement system of claim 2 wherein the opening is has a width that is greater than a predetermined diameter of a coin.

5. The adjustable device placement system of claim 2 wherein the opening has a width that is greater than a predetermined maximum width of connectors of cables that connect mobile electronic devices to the vehicle via a Universal Serial Bus (USB) port of the vehicle.

6. The adjustable device placement system of claim 1 wherein the teeth are located within the c-channels of the position mechanism.

7. The adjustable device placement system of claim 1 wherein the position mechanism slides vertically within the aperture when the teeth are disengaged from the notches in the aperture.

8. The adjustable device placement system of claim 1 wherein the bottom portion extends the predetermined distance away from the first face of the separator wall and toward the front wall of the center console bin at an angle that is perpendicular to the first face of the separator wall.

9. The adjustable device placement system of claim 1 wherein the bottom portion extends the predetermined distance away from the first face of the separator wall and toward the front wall of the center console bin forming an acute angle between the bottom portion and the first face of the separator wall.

10. The adjustable device placement system of claim 1 wherein the bottom portion extends the predetermined distance away from the first face of the separator wall and toward the front wall of the center console bin forming an obtuse angle between the bottom portion and the first face of the separator wall.

11. The adjustable device placement system of claim 1 wherein the position mechanism consists of a thermoplastic elastomer.

12. The vehicle, comprising:
 the adjustable device placement system of claim 1; and
 a wireless charging device positioned at the front wall of the center console bin.

13. The vehicle of claim 12 wherein the wireless charging device generates an electrical field within a predetermined area adjacent to the front wall of the center console bin within the center console bin.

14. The adjustable device placement system of claim 1 further comprising an armrest that covers the center console bin and that is hinged at one of:
 the back wall, the first side wall, and the second side wall.

15. The adjustable device placement system of claim 14 wherein the armrest:
 completely covers the second section; and
 does not cover the first section.

16. The adjustable device placement system of claim 1 wherein the bottom portion extends away from the first face of the separator wall and toward the front wall of the center console bin to within less than one millimeter from the front wall of the center console bin.

17. The adjustable device placement system of claim 16 wherein the bottom portion of the position mechanism includes an opening at a side of the bottom portion that is closest to the front wall of the center console bin.

18. A vehicle, comprising:
 a center console bin that includes a front wall, a back wall, a first side wall, and a second side wall;
 a separator wall within the center console bin that includes a first face and a second face opposite the first face and that divides the center console bin into:
  a first section defined by a first portion of the first side wall, a first portion of the second side wall, the front wall, and the first face of the separator wall; and
  a second section is defined by a second portion of the first side wall, a second portion of the second side wall, the back wall, and the second face of the separator wall;
 a wireless charging device that is positioned at the front wall of the center console bin and that generates an electrical field within a predetermined area adjacent to the front wall of the center console bin within the center console bin;
 an aperture defining a vertical opening within the separator wall, the aperture having notches spaced evenly vertically along the aperture;
 a position mechanism that:
  is disposed within the aperture;
  includes c-channels that are formed along lateral sides of the position mechanism and that receive sides of the separator wall that define the aperture such that the position mechanism;
  slides vertically within the aperture;
  includes tabs that extend perpendicularly away from the separator wall;
  includes teeth that enter the notches, thereby locking the position mechanism into a position; and
  a bottom portion that extends away from the first face of the separator wall and toward the front wall of the center console bin to within a predetermined distance of the front wall of the center console bin; and
 an opening formed at a side of the bottom portion that is closest to the front wall of the center console bin.

19. The vehicle of claim 18 wherein the bottom portion that extends away from the first face of the separator wall and toward the front wall of the center console bin to within one millimeter of the front wall of the center console bin.

20. The vehicle of claim 18 wherein the opening is trapezoidal.

* * * * *